(12) United States Patent
Jeong et al.

(10) Patent No.: US 12,543,789 B2
(45) Date of Patent: Feb. 10, 2026

(54) HEATER FOR AEROSOL GENERATING DEVICE AND AEROSOL GENERATING DEVICE INCLUDING THE SAME

(71) Applicant: KT&G CORPORATION, Daejeon (KR)

(72) Inventors: Jong Seong Jeong, Sejong (KR); Gyoung Min Go, Daejeon (KR); Hyung Jin Bae, Daejeon (KR); Jang Won Seo, Daejeon (KR); Chul Ho Jang, Daejeon (KR); Min Seok Jeong, Seoul (KR); Jin Chul Jung, Daejeon (KR)

(73) Assignee: KT&G CORPORATION, Daejeon (KR)

( * ) Notice: Subject to any disclaimer, the term of this patent is extended or adjusted under 35 U.S.C. 154(b) by 972 days.

(21) Appl. No.: 17/766,929

(22) PCT Filed: Jan. 13, 2022

(86) PCT No.: PCT/KR2022/000658
§ 371 (c)(1),
(2) Date: Jul. 21, 2022

(87) PCT Pub. No.: WO2022/154527
PCT Pub. Date: Jul. 21, 2022

(65) Prior Publication Data
US 2024/0081404 A1 Mar. 14, 2024

(30) Foreign Application Priority Data
Jan. 14, 2021 (KR) ........................ 10-2021-0005235

(51) Int. Cl.
*A24F 40/46* (2020.01)
*A24F 40/51* (2020.01)
(Continued)

(52) U.S. Cl.
CPC .............. *A24F 40/46* (2020.01); *A24F 40/51* (2020.01); *A24F 40/57* (2020.01);
(Continued)

(58) Field of Classification Search
CPC .......... A24F 40/46; A24F 40/57; A24F 40/51; H05B 3/10; H05B 3/26; H05B 3/20; H05B 2203/005; H05B 2203/013
See application file for complete search history.

(56) References Cited

U.S. PATENT DOCUMENTS 4,965,436 A 10/1990 Churchill
9,239,555 B2 1/2016 Tamemasa et al.
(Continued)

FOREIGN PATENT DOCUMENTS

CN 101072529 A 11/2007
CN 204325497 U 5/2015
(Continued)

OTHER PUBLICATIONS

Machine Translation of Lui (CN 204325497) performed on May 27, 2025 (Year: 2015).*
(Continued)

*Primary Examiner* — Brian W Jennison
(74) *Attorney, Agent, or Firm* — Sughrue Mion, PLLC

(57) ABSTRACT

Provided is a heater for an aerosol-generating device including a first electrically conductive pattern configured to perform heating and a second electrically conductive pattern arranged in parallel with the first electrically conductive pattern. The first electrically conductive pattern and/or the second electrically conductive pattern may include a material having a relatively small resistance temperature coefficient. Accordingly, a temperature increase rate of the heater may be greatly improved.

11 Claims, 9 Drawing Sheets

(51) Int. Cl.
*A24F 40/57* (2020.01)
*G05D 23/24* (2006.01)
*H05B 3/10* (2006.01)
*H05B 3/20* (2006.01)
*H05B 3/26* (2006.01)

(52) U.S. Cl.
CPC .......... *G05D 23/2401* (2013.01); *H05B 3/10* (2013.01); *H05B 3/26* (2013.01); *H05B 3/20* (2013.01); *H05B 2203/005* (2013.01); *H05B 2203/013* (2013.01)

(56) References Cited

U.S. PATENT DOCUMENTS

| | | |
|---|---|---|
| 2002/0179592 A1 | 12/2002 | Hiramatsu et al. |
| 2020/0045775 A1 | 2/2020 | Ohse et al. |
| 2020/0196665 A1 | 6/2020 | Bilat et al. |
| 2020/0236739 A1* | 7/2020 | Ohse ................. H05B 3/78 |
| 2020/0237008 A1 | 7/2020 | Thorens |
| 2020/0345076 A1* | 11/2020 | Lim ................. H05K 1/181 |
| 2020/0359698 A1 | 11/2020 | Lim et al. |
| 2020/0359704 A1* | 11/2020 | Deng ................. A24F 40/70 |
| 2022/0378103 A1 | 12/2022 | Zuber et al. |

FOREIGN PATENT DOCUMENTS

| | | |
|---|---|---|
| CN | 111050581 A | 4/2020 |
| CN | 111772245 A | 10/2020 |
| EP | 3 954 236 A2 | 2/2022 |
| JP | 6-5181 U | 1/1994 |
| JP | 07-027798 B2 | 3/1995 |
| JP | 7-26725 U | 5/1995 |
| JP | 8-152800 A | 6/1996 |
| JP | 10-31379 A | 2/1998 |
| JP | 2000-340343 A | 12/2000 |
| JP | 2004-031147 A | 1/2004 |
| JP | 2004-31241 A | 1/2004 |
| JP | 2004-296445 A | 10/2004 |
| JP | 2013-8510 A | 1/2013 |
| JP | 2016-96037 A | 5/2016 |
| JP | 6070166 B2 | 2/2017 |
| JP | 2019-532478 A | 11/2019 |
| JP | 2020-527344 A | 9/2020 |
| KR | 10-1927135 B1 | 12/2018 |
| KR | 10-2019-0033531 A | 3/2019 |
| KR | 10-2019-0049391 A | 5/2019 |
| KR | 10-2029225 B1 | 10/2019 |
| UA | 106255 C2 | 8/2014 |
| WO | 2006/061 499 A1 | 6/2006 |
| WO | 2011/063970 A1 | 6/2011 |

OTHER PUBLICATIONS

Office Action issued Dec. 14, 2023 in Russian Application No. 2022109243/03.
Office Action dated Sep. 24, 2022 from the Korean Intellectual Property Office in Application No. 10-2021-0005235.
International Search Report issued Apr. 20, 2022 in International Application No. PCT/KR2022/000658.
Notification of Reasons for Refusal dated Apr. 4, 2023 from the Japanese Patent Office in application No. 2022-525392.
Extended European Search Report dated Jan. 9, 2023 in Application No. 22711431.1.
Communication dated Jan. 26, 2025 in Chinese Application No. 202280000947.5.
Chinese Office Action dated Jul. 19, 2025 in Application No. 202280000947.5.

* cited by examiner

[Fig. 1]
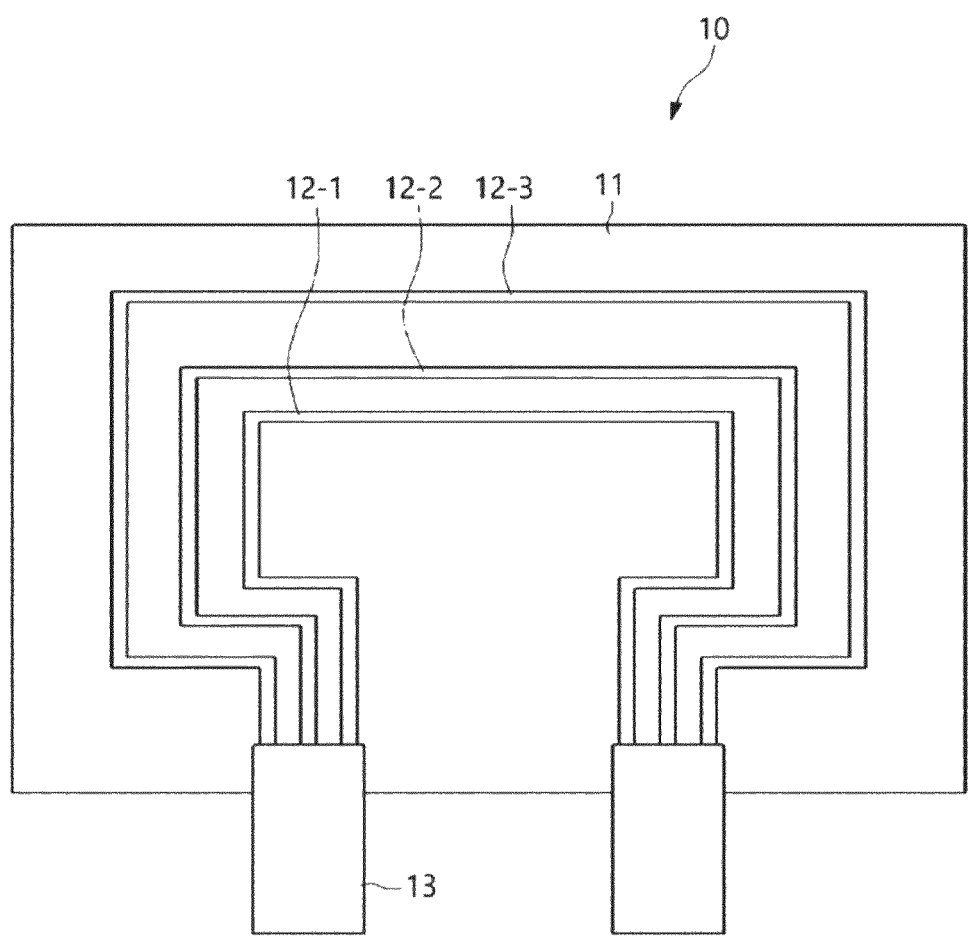

[Fig. 2]
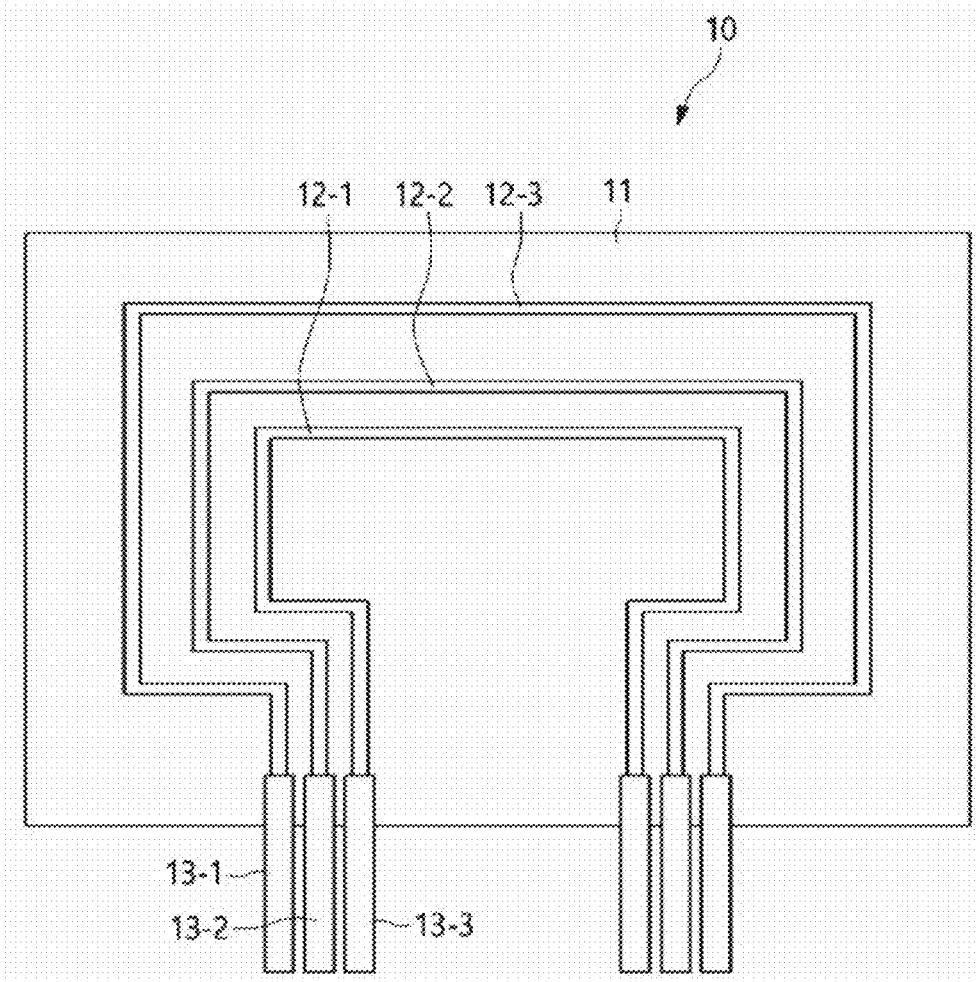
[Fig. 3]
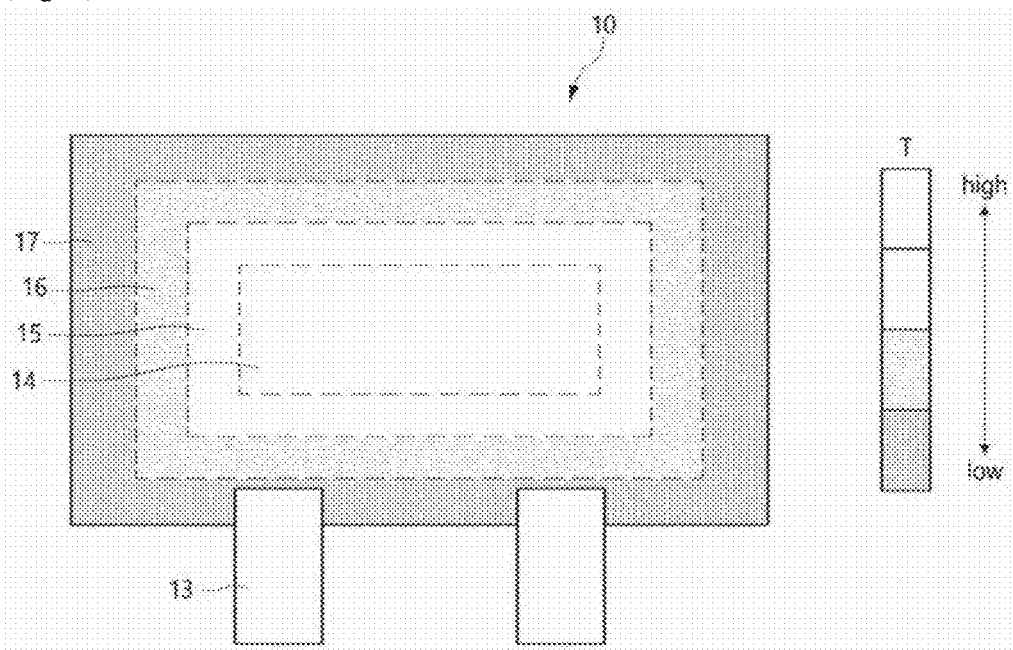

[Fig. 4]
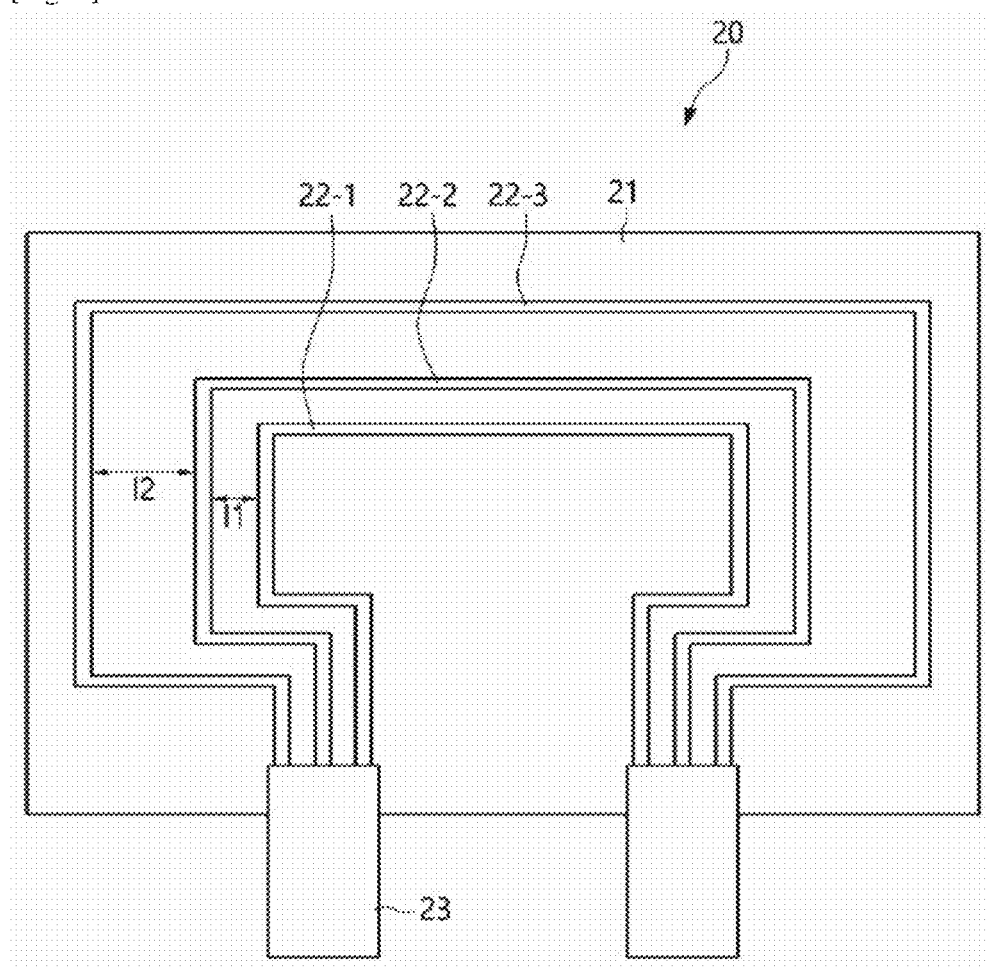

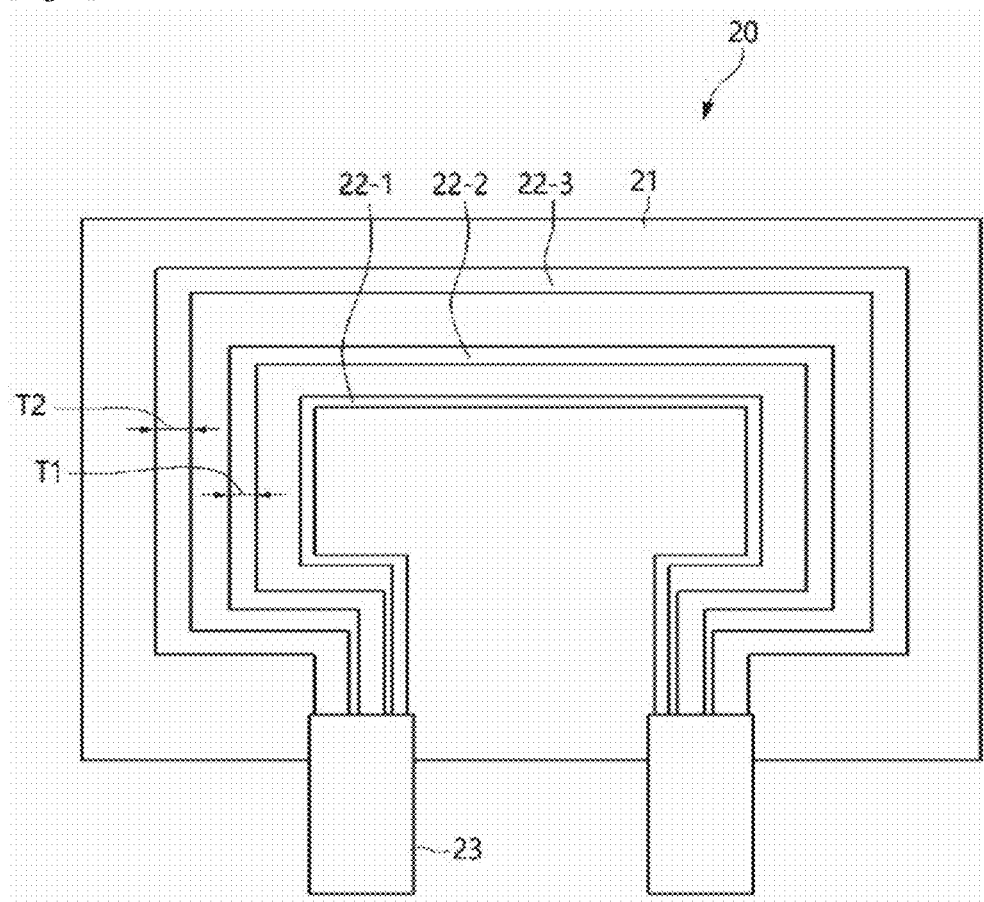

[Fig. 6]
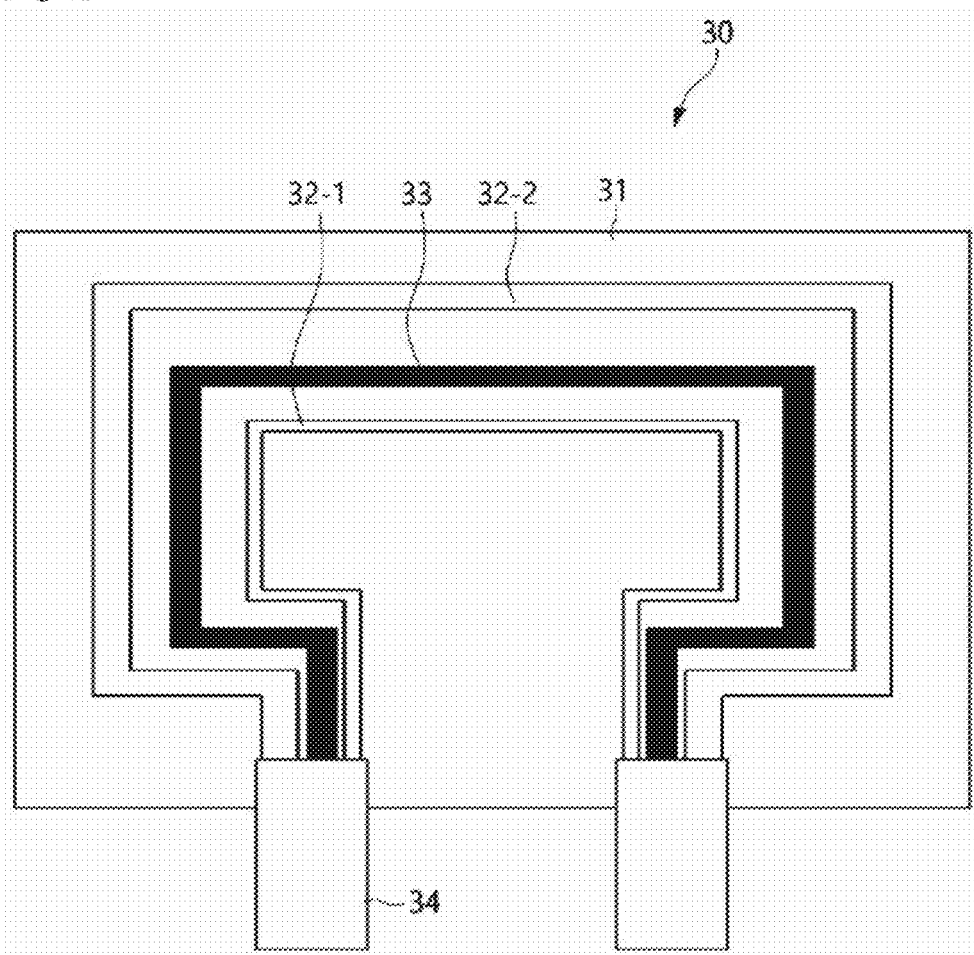
[Fig. 7]
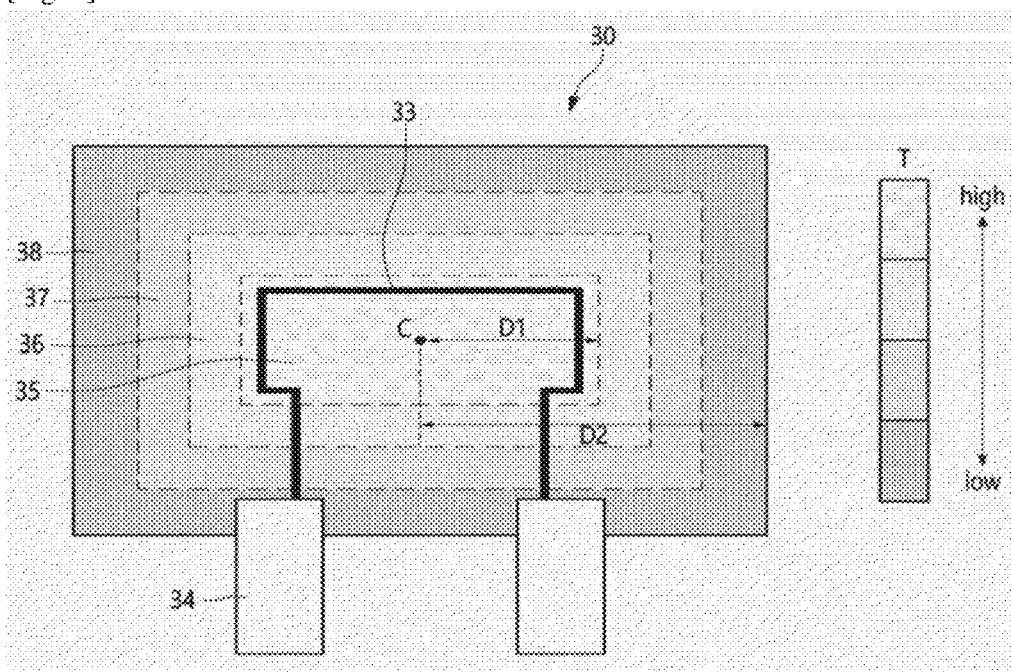

[Fig. 8]
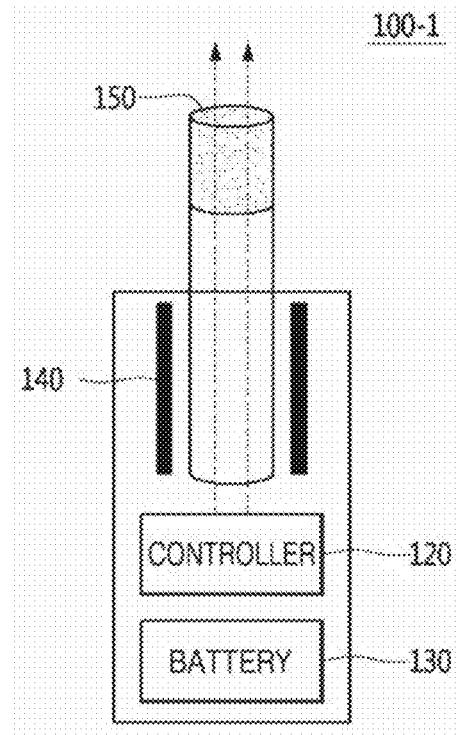
[Fig. 9]
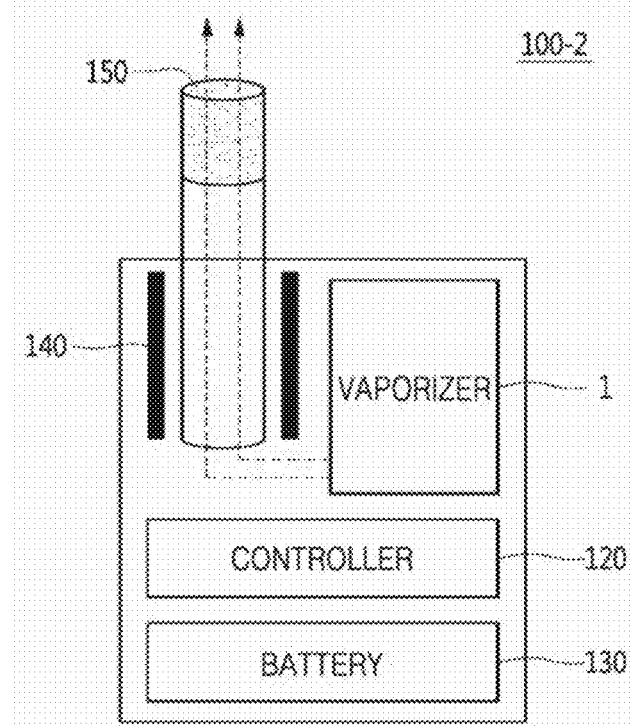

[Fig. 10]
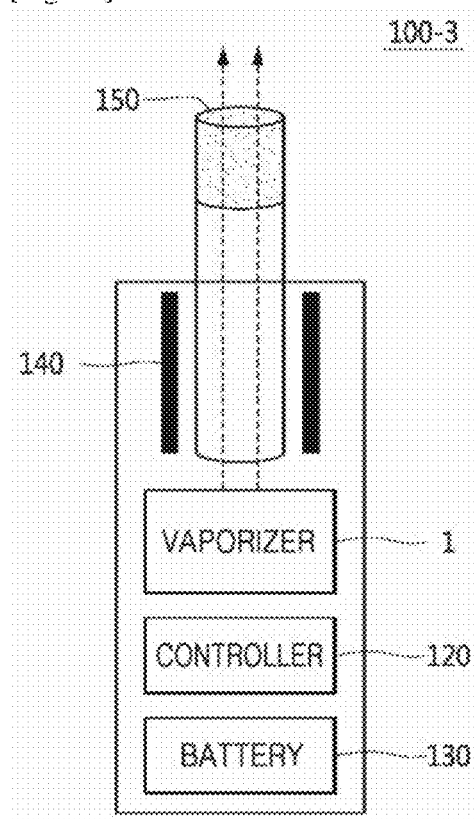
[Fig. 11]
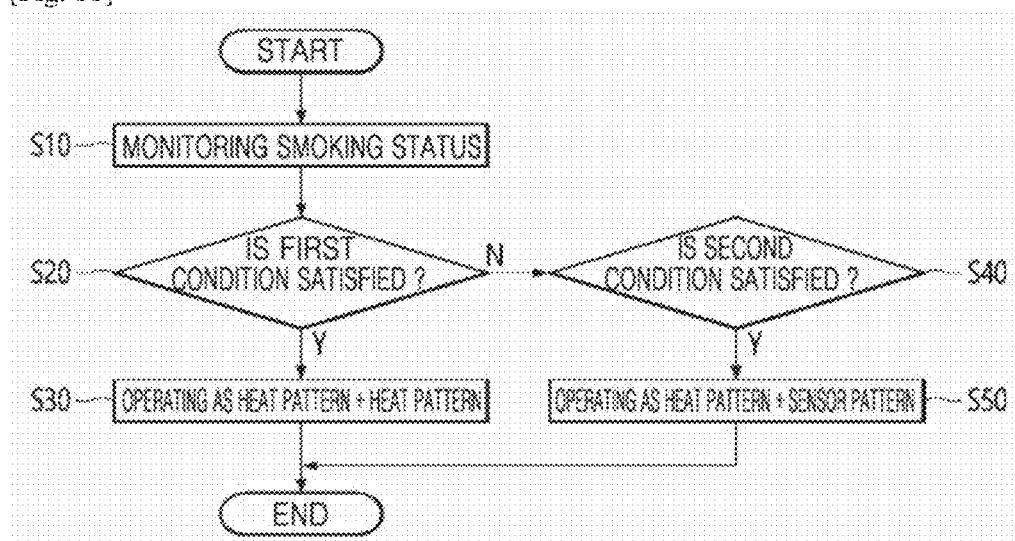

[Fig. 12]
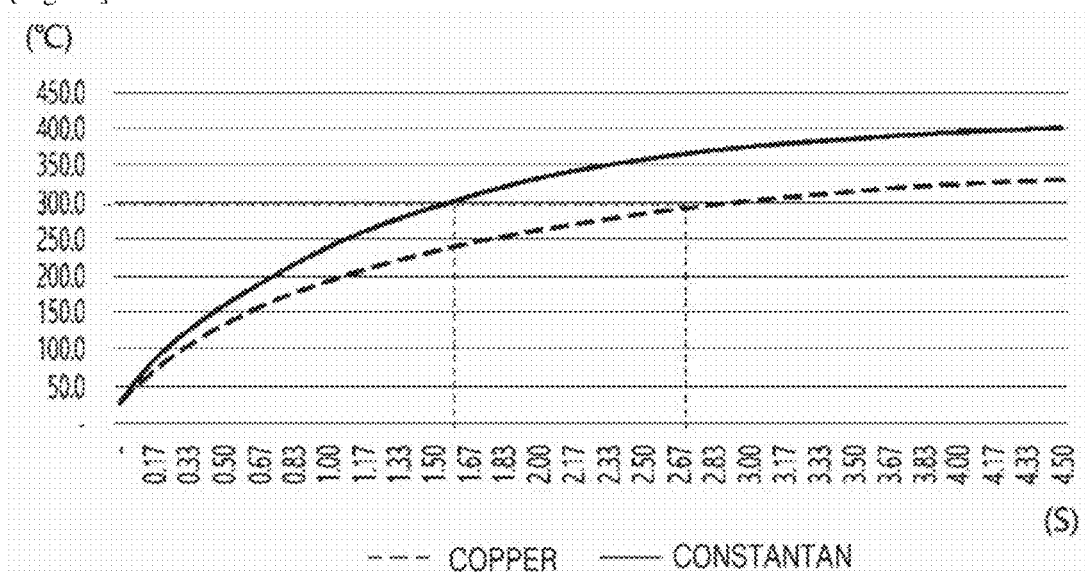
[Fig. 13]
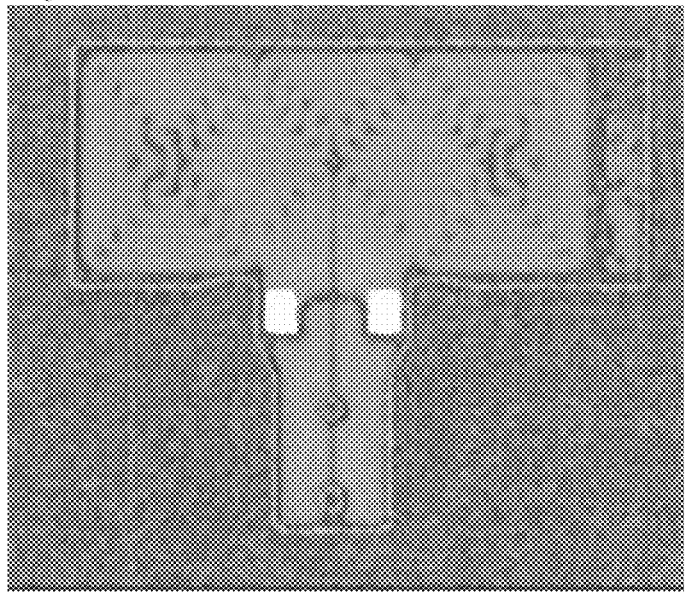
[Fig. 14]

[Fig. 15]
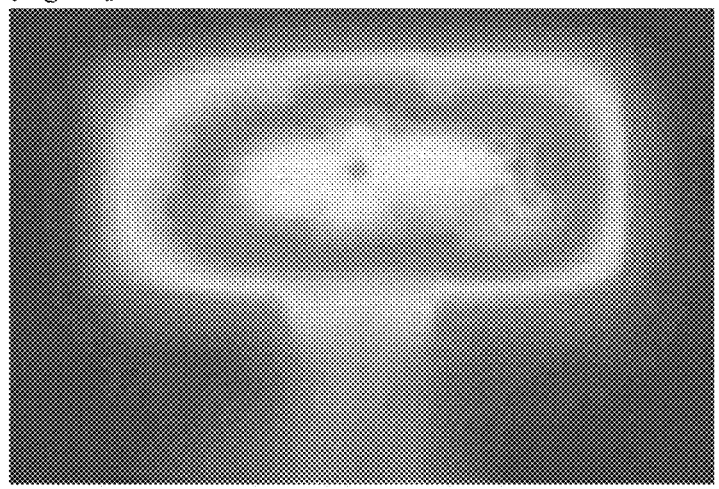

HEATER FOR AEROSOL GENERATING DEVICE AND AEROSOL GENERATING DEVICE INCLUDING THE SAME

TECHNICAL FIELD

One or more embodiments of the present disclosure relate to a heater for an aerosol generating device and an aerosol generating device including the same. More particularly, one or more embodiments of the present disclosure relate to a heater for an aerosol generating device, the heater being configured to ensure a high-speed temperature rise, and an aerosol generating device including the same.

BACKGROUND ART

Recently, there has been an increasing demand for alternative smoking articles that overcome the disadvantages of traditional combustive cigarettes. For example, there is an increasing demand for devices that generate aerosols by electrically heating cigarettes (e.g., cigarette-type electronic cigarettes). Accordingly, research on an electrically heated aerosol generating device has been actively conducted.

Recently, an aerosol generating device configured to heat the outside of a cigarette through a film heater has been proposed. A film heater may be a thin film-type heater on which an electrically conductive pattern is formed. The material of the electrically conductive pattern includes, for example, copper, aluminum, etc.

However, because the example materials of the electrically conductive pattern have a relatively large temperature coefficient of resistance (TCR), there is a disadvantage in that the temperature increase rate may be relatively slow when heat is generated. That is, the example materials require more time to reach a target temperature because the resistance value of the electrically conductive pattern increases more when the temperature is raised compared to other materials having a small resistance temperature coefficient. In addition, the slow heating rate may increase the preheating time of the aerosol generating device and reduce the taste of early smoking.

DISCLOSURE OF INVENTION

Technical Problem

One or more embodiments provide a heater for an aerosol generating device configured to ensure a relatively high-speed temperature rise, and an aerosol generating device including the same.

One or more embodiments also provide a heater for an aerosol generating device that may ensure a uniform heat distribution and an aerosol generating device including the same.

One or more embodiments also provide a method of improving control precision by reducing a temperature measurement error of a heater for an aerosol generating device.

One or more embodiments also provide a method of controlling a heater for an aerosol generating device, the heater including a plurality of electrically conductive patterns.

Solution to Problem

A heater according to embodiments may include a first electrically conductive pattern performing a heating function, and a second electrically conductive pattern arranged in parallel with the first electrically conductive pattern. For example, the first electrically conductive pattern may include a material having a temperature coefficient of resistance that is less than or equal to 1,000 ppm/° C.

An aerosol generating device according to embodiments may include a housing forming an accommodating space in which an aerosol-generating article may be accommodated, and a heater configured to heat the aerosol-generating article accommodated in the accommodating space. The heater includes a first electrically conductive pattern made of a material having a temperature coefficient of resistance less than or equal to 1,000 ppm/° C. and a second electrically conductive pattern arranged in parallel with the first electrically conductive pattern.

Advantageous Effects of Invention

According to embodiments, a heater for an aerosol generating device including an electrically conductive pattern made of a material having a relatively small resistance temperature coefficient may be provided. Such a heater may shorten the preheating time of the aerosol generating device by ensuring a high-speed temperature rise, and may greatly improve the taste of early smoking.

In addition, a plurality of electrically conductive patterns may be arranged in a parallel structure, and a resistance value of the outer pattern may be designed to be less than or equal to a resistance value of the center pattern. Accordingly, heat may be more uniformly generated over the entire heating surface of the heater, thereby improving the heating efficiency of the aerosol generating device.

In addition, at least one of the plurality of electrically conductive patterns may be used as a sensor configured to measure the temperature of the heater. Accordingly, a process of mounting a separate temperature sensor when manufacturing the aerosol generating device may not be needed, and thus the device manufacturing process may be simplified. In addition, the temperature of the heater heating surface may be more accurately measured through the sensor pattern. Accordingly, the control precision of the heater may be improved.

Effects according to embodiments are not limited to the above-mentioned effects, and other effects not mentioned will be clearly understood by those skilled in the art from the following description.

BRIEF DESCRIPTION OF DRAWINGS

FIGS. 1 and 2 are example views illustrating a film-type heater according to an embodiment.

FIG. 3 is an example view illustrating a heat concentration phenomenon of a film-type heater according to embodiments.

FIGS. 4 and 5 are example views illustrating a film-type heater according to an embodiment.

FIGS. 6 and 7 are example views illustrating a film-type heater according to an embodiment.

FIGS. 8, 9, and 10 illustrate various types of aerosol generating devices to which a film-type heater according to embodiments may be applied.

FIG. 11 is an example flowchart illustrating a method of controlling a film-type heater according to embodiments.

FIG. 12 shows related experimental results with respect to a temperature increase rate of the film-type heater.

FIG. 13 illustrates a pattern structure of a film-type heater according to an embodiment.

FIGS. 14 and 15 show results of related experiments conducted on the heat distribution of the film-type heater.

BEST MODE FOR CARRYING OUT THE INVENTION

A heater according to embodiments may include a first electrically conductive pattern configured to perform a heating function, and a second electrically conductive pattern arranged in parallel with the first electrically conductive pattern. For example, the first electrically conductive pattern may include a material having a temperature coefficient of resistance less than or equal to 1,000 ppm/° C.

In embodiments, the first electrically conductive pattern may include at least one of constantan, manganin, and nickel silver.

In embodiments, the first electrically conductive pattern may include a material having a resistivity greater than or equal to $3.0 \times 10^{-8}$ Ωm.

In embodiments, the second electrically conductive pattern may be arranged outside the first electrically conductive pattern, and a resistance of the second electrically conductive pattern may be less than or equal to a resistance of the first electrically conductive pattern.

In embodiments, the second electrically conductive pattern may be arranged outside of the first electrically conductive pattern, and the heater may further include a third electrically conductive pattern arranged outside of the second electrically conductive pattern. A gap between the third electrically conductive pattern and the second electrically conductive pattern may be wider than a gap between the second electrically conductive pattern and the first electrically conductive pattern.

In embodiments, the second electrically conductive pattern may be arranged outside of the first electrically conductive pattern, and the second electrically conductive pattern may include a material having a resistivity less than a resistivity of the first electrically conductive pattern.

In embodiments, the second electrically conductive pattern may be arranged outside of the first electrically conductive pattern, and a thickness of the second electrically conductive pattern may be greater than a thickness of the first electrically conductive pattern.

In embodiments, the thickness of the second electrically conductive pattern may be less than or equal to 30 μm.

In embodiments, the second electrically conductive pattern may measure temperature for the heater, and may include a material having a temperature coefficient of resistance greater than a temperature coefficient of resistance of the first electrically conductive pattern.

In embodiments, the second electrically conductive pattern may be arranged to measure the temperature of the central region of the heating surface of the heater, and the distance from the center of the heating surface to the periphery of the central region may be 0.15 to 0.5 times the distance from the center to the periphery of the heating surface.

An aerosol generating device according to embodiments may include a housing forming an accommodating space in which an aerosol-generating article is accommodated, and a heater configured to heat the aerosol-generating article accommodated in the accommodating space, wherein the heater may include a first electrically conductive pattern made of a material having a temperature coefficient of resistance less than or equal to 1,000 ppm/° C., and a second electrically conductive pattern arranged in parallel with the first electrically conductive pattern.

In embodiments, the aerosol generating device may further include a controller configured to control the heater, wherein the controller may independently control the first electrically conductive pattern and the second electrically conductive pattern.

MODE FOR THE INVENTION

Hereinafter, embodiments are described in detail with reference to the accompanying drawings. Advantages and features of the present disclosure, and methods of achieving them will become apparent with reference to the embodiments described below in detail in conjunction with the accompanying drawings. However, the technical idea is not limited to the following embodiments and may be implemented in various different forms. The following embodiments are provided to describe the technical idea of the present disclosure, and to inform those of ordinary skill in the art to which the present disclosure belongs, the scope of the present disclosure. In addition, the technical idea of the present disclosure is only defined by the scope of the claims and their equivalents.

In each drawing, the same components are given the same reference numerals even though they may be indicated in different drawings. In addition, in describing the present disclosure, when it is determined that a detailed description of a related known configuration or function may obscure the gist of the present disclosure, the detailed description thereof will be omitted.

Unless otherwise defined, all terms (including technical and scientific terms) used herein may be used with the meanings that may be commonly understood by those of ordinary skill in the art to which this disclosure belongs. In addition, terms defined in a commonly used dictionary are not to be interpreted ideally or excessively unless clearly specifically defined. The terminology used herein is for the purpose of describing the embodiments and is not intended to limit the present disclosure. In this specification, the singular also includes the plural, unless the phrase specifically states otherwise.

In addition, in describing the components of the present disclosure, terms such as "first," "second," "A," "B," "(a)," "(b)," etc. may be used. These terms are only for distinguishing the component from other components, and the essence, sequence, or order of the corresponding component is not limited by the term. When a component is described as being "connected", "coupled" or "accessed" to another component, the component may be directly connected or accessed to the other component, but it should be understood that another component may be "connected", "coupled" or "accessed" between each component.

"Comprises" and/or "comprising" used in the present disclosure does not exclude the presence or addition of one or more other elements, steps, operations and/or elements in addition to a stated element, step, operation and/or element.

In the embodiments, an aerosol-generating substrate may be a material configured to generate an aerosol. Aerosols may include volatile compounds. The aerosol-generating substrate may be solid or liquid.

For example, the solid aerosol-generating substrate may include a solid material based on raw tobacco materials, such as leaf tobacco, cut filler, reconstituted tobacco, etc., and the liquid aerosol-generating substrate may include a liquid composition based on nicotine, tobacco extract and/or various flavoring agents. However, embodiments are not limited to the examples listed above.

For example, the liquid aerosol-generating substrate may include at least one of propylene glycol (PG) and glycerin (GLY), and may further include at least one of ethylene glycol, dipropylene glycol, diethylene glycol, triethylene glycol, tetraethylene glycol, and oleyl alcohol. As another example, the aerosol-generating substrate may further include at least one of nicotine, moisture, and a flavoring substance. As another example, the aerosol-generating substrate may further include various additives such as cinnamon and capsaicin. The aerosol-generating substrate may include a material in the form of a gel or solid as well as a liquid material having a relatively high flowability. As such, the composition of the aerosol-generating substrate may be variously selected depending on the embodiment, and the composition ratio thereof may also vary depending on the embodiment. In the present disclosure, liquid may refer to a liquid aerosol-generating substrate.

In the embodiments, an aerosol-generating device may be a device that generates an aerosol using an aerosol-generating substrate to generate an aerosol that may be directly inhaled into a user's lungs through the user's mouth. FIGS. 8 to 10 illustrate examples of aerosol-generating devices.

In the embodiments, an aerosol-generating article may be an article configured to generate an aerosol. The aerosol-generating article may include an aerosol-generating substrate. For example, an aerosol-generating article may be a cigarette, but embodiments are not limited thereto.

In the embodiments, puff may indicate inhalation by the user, and inhalation may be a situation in which an aerosol is drawn into the user's mouth, nasal cavity, or lungs through the user's mouth or nose.

Hereinafter, various embodiments of the present disclosure are described.

According to embodiments, a heater configured to ensure high-speed temperature rise may be provided. For example, the heater according to the embodiment performs a heating function with an electrically conductive material having a relatively small temperature coefficient of resistance (hereinafter, "TCR"), thereby guaranteeing a high temperature increase. A material with a small TCR has a slight increase in resistance when the temperature is raised, so that the amount of current is hardly reduced, and this is due to a rapid temperature increase being possible. When such a heater is applied to an aerosol-generating device, the effect of shortening the preheating time of the device and greatly improving the taste of early smoking may be achieved due to the high-speed temperature rise. However, the use of such a heater is not limited to an aerosol generating device. Hereinafter, as an example, it is assumed that the heater is used for the purpose of the aerosol generating device.

Examples of the material having a relatively small TCR include constantan, manganin, nickel silver, and the like. However, embodiments are not limited thereto. Table 1 below shows the TCR of an electrically conductive material such as constantan, copper, aluminum, etc.

TABLE 1

| classification | copper | aluminum | SUS304 | constantan |
|---|---|---|---|---|
| TCR (ppm/° C.) | 3900 | 3900 | 2000 | 8 |

In embodiments, an electrically conductive material having a TCR less than or equal to about 1500 ppm/° C. may be used for the heater. For example, a material having a TCR less than or equal to about 1,000 ppm/° C., 700 ppm/° C., 500 ppm/° C., 300 ppm/° C., or about 100 ppm/° C. may be used. For example, a material having a TCR less than or equal to about 50 ppm/° C., 30 ppm/° C., or about 20 ppm/° C. may be used. In this case, the high-speed heating of the heater may be ensured more reliably. According to embodiments, a film-type heater including an electrically conductive pattern made of a material having a relatively small TCR may be provided. However, embodiments are not limited thereto, and the type of heaters may be different from the film type. Hereinafter, it will be described in detail with reference to the drawings below with respect to the film-type heater according to the embodiments.

FIG. 1 is an example view illustrating a film-type heater 10 according to an embodiment.

As shown in FIG. 1, the film-type heater 10 may include a base film 11, one or more electrically conductive patterns 12-1, 12-2, and 12-3, and a terminal 13. However, only the components related to the embodiment are illustrated in FIG. 1. Accordingly, those of ordinary skill in the art to which the present disclosure pertains may understand that other general-purpose components other than those shown in FIG. 1 may be further included. Hereinafter, when referring to an electrically conductive pattern 12-1, 12-2 or 12-3 or a plurality of electrically conductive patterns 12-1 to 12-3, reference number "12" may be used. In addition, the film-type heater 10 may be abbreviated as "heater 10" and the electrically conductive pattern 12 may be abbreviated as "pattern 12".

The base film 11 may be a heat-resistant or insulating film constituting the base of the heater 10. For example, a heat-resistant or insulating film such as a polyimide (hereinafter, "PI") film may be used as the base film 11. One or more patterns 12 may be formed on the base film 11. In this case, the pattern 12 may be formed in various ways, such as by printing and application. However, embodiments are not limited to a specific pattern formation method.

The heater 10 may further include a cover film covering the upper surface of the heater 10 in addition to the base film 11. The cover film may also include a heat-resistant film or insulating film such as a PI film.

The pattern 12 may perform a heating function when power (or voltage) is applied through the terminal 13. In some examples, the specific pattern, for example, pattern 12-1, may perform a temperature measurement function rather than a heating function, which will be described later with reference to drawings such as FIG. 6.

As mentioned above, the pattern 12 may include a material having a relatively small TCR. For example, as the pattern 12, an electrically conductive material having a TCR les than or equal to about 1500 ppm/° C. may be used, For example, a material having a TCR less than or equal to about 1,000 ppm/° C., 700 ppm/° C., 500 ppm/° C., 300 ppm/° C. or about 100 ppm/° C. may be used. For example, a material having a TCR less than or equal to about 50 ppm/° C., 30 ppm/° C., or about 20 ppm/° C. may be used. In this case, high-speed temperature rise of the heater 10 may be ensured.

In embodiments, as shown in FIG. 1, a plurality of patterns 12 may be arranged (formed) in a parallel structure. Although FIG. 1 shows as an example that three patterns 12-1 to 12-3 are arranged in a parallel structure, the number of patterns 12 may be variously designed. For example, the number of patterns 12 may be determined based on a heating area of the heater 10 and a target resistance of the entire heater 10. For example, when the target resistance is the same, the number of patterns 12 may increase as the heating area decreases, because the length of the pattern 12 must be shortened in order to satisfy the same target resistance value within a narrow area.

The number and/or arrangement structure of the patterns 12 is related to the heating area and target resistance of the heater 10, but may also be closely related to the resistivity of the material. A material having high resistivity increases the overall resistance of the heater 10 by increasing the resistance of the pattern 12. Accordingly, when the pattern 12 includes a material having high resistivity, the plurality of patterns 12 may be arranged in a parallel structure to satisfy the target resistance. For example, as constantan has a relatively small TCR but high resistivity resistance compared to copper, etc., when constantan is used as the material of the pattern 12, a plurality of patterns 12 may be arranged in a parallel structure in order to lower the overall resistance.

In embodiments, at least one of the plurality of patterns 12 arranged in a parallel structure includes a material having a resistivity greater than or equal to about $1.0 \times 10^{-8}$ Ωm, $3.0 \times 10^{-8}$ Ωm, $5.0 \times 10^{-8}$ Ωm, or $7.0 \times 10^{-8}$ Ωm. Even if a material having such a resistivity value is used, a target resistance configured to sufficiently exhibit heating performance through a parallel structure may be satisfied.

The terminal 13 may be a circuit element configured to apply power (or voltage) to the pattern 12. Those skilled in the art would understand the configuration and function of the terminal 13, and detailed description thereof are omitted.

The terminal 13 may be designed to collectively apply power to the plurality of patterns 12, or may be designed to independently apply power to each pattern 12. For example, as shown in FIG. 2, each of the plurality of terminals 13-1, 13-2, and 13-3 may be connected to independently apply power to each of the patterns 12-1 to 12-3. In this case, the operation of the first pattern 12-1 may be independently controlled through the first terminal 13-1, and the operation of the second pattern 12-2 may be independently controlled through the second terminal 13-3, so that a more precise control of the heater 10 may be possible. This control method will be described in detail later with reference to FIG. 11.

The heater 10 according to the embodiment has been described with reference to FIGS. 1 and 2. According to the foregoing, the heater 10 for an aerosol-generating device including an electrically conductive pattern made of a material having a relatively small TCR may be provided. This heater 10 may shorten the preheating time of the aerosol-generating device and greatly improve the taste of early smoking, by ensuring a high-speed temperature rise. In relation to the heating rate of the heater 10, reference is made to experimental Example 1 below.

As illustrated in FIG. 1, when a plurality of patterns 12 are arranged in a parallel structure, a phenomenon in which heat (amount) is concentrated to the center of the heating surface of the heater 10 may occur. For example, as shown in FIG. 3, a phenomenon may occur that the central region 14 of the heating surface of the heater 10 generates heat at the highest temperature, and the heating temperature decreases toward the outer regions 15, 16, and 17. This phenomenon occurs because the resistance value also increases as the length of the outer pattern (e.g., 12-3) becomes longer than the length of the central pattern (e.g., 12-1). Hereinafter, the heater 20 according to an embodiment, configured to prevent such heating concentration phenomenon is described.

FIG. 4 is an example view illustrating the heater 20 according to an embodiment.

As shown in FIG. 4, the heater 20 according to the embodiment may also include a base film 21, a plurality of patterns 22-1, 22-2, and 22-3, and a terminal 23. However, in order to ensure a uniform heat distribution, the outer pattern (e.g., 22-3) may be designed to have a resistance value less than or equal to a resistance of the central pattern (e.g., 22-1 in FIG. 4). Based on the resistance values, the phenomenon in which the amount of heat generated by the heating surface being concentrated in the central region may be alleviated.

A method of implementing the resistance values of the outer pattern (e.g., 22-3) and the center pattern (e.g., 22-1) may vary depending on an embodiment.

In embodiments, a resistance value may be implemented through a gap difference between patterns. For example, as shown in FIG. 4, a plurality of patterns 22-1 to 22-3 are arranged, and the interval I2 between the third pattern 22-3 and the second pattern 22-2 may be wider than the interval I1 between the second pattern 22-2 and the first pattern 22-1. In this case, as the area of the outer patterns (e.g., 22-3, 22-2) increases, the resistance value of the outer patterns may decrease. That is, as the area occupied by the outer patterns (e.g., 22-3 and 22-2) becomes larger compared to the length of the outer pattern, the resistance value of the outer pattern may be decreased. Accordingly, the resistance value of the outer pattern (e.g., 22-3) may be implemented in a form in which the resistance value of the outer pattern is not greater than the resistance value of the central pattern (e.g., 22-1).

In embodiments, a resistance value of a pattern may be implemented through a material difference of the pattern. For example, the second pattern (e.g., 22-3) arranged outside the first pattern (e.g., 22-1) may include a material having a resistivity lower than a resistivity of the first pattern (e.g., 22-1). For example, the first pattern may include a constantan material, and the second pattern may include a copper material. The resistance value of the outer pattern (e.g., 22-3) may be implemented in a form in which the resistance value of the outer pattern is not greater than the resistance value of the central pattern (e.g., 22-1).

In embodiments, a resistance value may be implemented through a thickness difference between patterns. For example, as shown in FIG. 5, the thickness T2 of the second pattern 22-3 arranged outside the first pattern 22-2 may be greater than the thickness T1 of the first pattern 22-2. In this example, the resistance value may be implemented in a form in which the resistance value of the outer pattern (e.g., 22-3) may not be greater than that of the central pattern (e.g., 22-2), due to an increase in the thickness of the pattern.

However, when the thickness of the pattern (e.g., 22-3) is excessively thick, the flexibility of the heater 20 may decrease and the functionality as the film-type heater 20 may be lost or reduced, so the pattern (e.g., 22-3) may need to have an appropriate thickness (e.g., T2). In embodiments, the thickness (e.g., T2) of the pattern (e.g., 22-3) may be less than or equal to about 60 μm. For example, the thickness (e.g., T2) may be less than or equal to about 50 μm, 40 μm, 30 μm or 10 μm. Within this numerical range, the flexibility of the film-type heater 20 may be ensured. In addition, the thickness (e.g., T2) of the pattern (e.g., 22-3) may be greater than or equal to about 10 μm, which may be understood to prevent an increase in the difficulty of the pattern forming process and a sharp increase in the resistance value.

The heater 20 according to the embodiment has been described with reference to FIGS. 4 and 5. According to the above description, the plurality of electrically conductive patterns 22-1 to 22-3 may be arranged in a parallel structure, and the resistance value of the outer pattern (e.g., 22-3) may be designed not to be greater than that of the central pattern (e.g., 22-1). Accordingly, uniform heat may be generated over the entire heating surface of the heater 20. In relation to the heat distribution of the heater 20, reference is made to experimental Example 2 below.

Hereinafter, the heater 30 according to an embodiment is described with reference to FIGS. 6 and 7.

FIG. 6 is a view illustrating the heater 30 according to an embodiment.

As shown in FIG. 6, the heater 30 according to the embodiment may also include a base film 31, a plurality of patterns 32-1, 32-2, and 33, and a terminal 34. However, a specific pattern 33 among the plurality of patterns 32-1, 32-2, and 33 may operate as a sensor performing a temperature measurement function of the heater 30. For example, the temperature of the heater 30 may be measured using the TCR of the specific pattern 33. Those skilled in the art would understand the TCR-based temperature measurement technique, and a detailed description thereof is omitted. Hereinafter, the terms sensor pattern 33 and heating patterns 32-1 and 32-2 are used to distinguish two types of patterns having different functions.

In this embodiment, the sensor pattern 33 may include a material having a larger TCR than a TCR of the heating pattern (e.g., 32-1). For example, when the heating pattern (e.g., 32-1) includes a material such as constantan, the sensor pattern 33 may include a copper material, and the heating temperature of the heater may be more accurately measured through the sensor pattern 33.

The heating pattern (e.g., 32-1) and the sensor pattern 33 may be implemented by various methods.

In embodiments, the sensor pattern 33 may be manufactured to have a greater resistance than a resistance of the heating pattern (e.g., 32-1). For example, the resistance value of the sensor pattern 33 may be greater than or equal to about 5 times, 6 times, 7 times, or about 10 times of the resistance value of the heating pattern (e.g., 32-1). This difference in resistance may be achieved by using a material having a high resistivity or by manufacturing the sensor pattern 33 with a relatively thin thickness or a relatively long length. In this example, even when electric power is applied to the heater 30, almost no current flows in the sensor pattern 33, so that the sensor pattern 33 may more accurately perform only the temperature measurement function.

In embodiments, the sensor pattern 33 may have a resistance value similar to that of the heating pattern (e.g., 32-1), but the power (or voltage) applied to the sensor pattern 33 may be designed to be much smaller than the heating pattern (e.g., 32-1). For example, when the sensor pattern 33 is connected to the first terminal and the heating pattern (e.g., 32-1) is configured to be connected to the second terminal, the controller may apply relatively small power to the first terminal, so that the pattern 33 may operate as a sensor pattern. In this case, the controller may operate a specific pattern (e.g., 32-1) as a sensor pattern or a heating pattern by controlling the power applied to each terminal. In another example, the power applied to the sensor pattern 33 may be configured to be reduced through a circuit element that generates a voltage drop.

The number and arrangement positions of the sensor patterns 33 may be designed in various ways.

In embodiments, the sensor pattern 33 may be arranged such that the temperature of the central region of the heating surface of the heater 30 is measured (sensed). For example, as shown in FIG. 7, at least a portion of the sensor pattern 33 may be arranged in the central region 35. In this case, the sensor pattern 33 may more accurately measure the temperature of the central region 35 rather than the outer regions 36 to 38. This is in consideration of the heat concentration phenomenon as described above, and this is because, when the heat concentration phenomenon occurs, controlling the heater 30 based on the temperature of the central region 33 may further improve control precision.

In the embodiments, the distance D1 from the center C of the heating surface of the heater 30 to the periphery of the central region 35 may be about 0.15 to 0.5 times the distance D2 from the center C to the periphery of the heating surface, and for example, about 0.2 times to 0.5 times, about 0.15 times to 0.4 times, about 0.2 times to 0.4 times, or about 0.2 times to 0.3 times. As heat is concentrated in the central region 35 formed within this numerical range, disposing the sensor pattern 33 in the corresponding central region 35 may be more effective in improving control precision of the heater 30.

The heater 30 according to the embodiment has been described with reference to FIGS. 6 and 7. As described above, at least one (e.g., 33) of the plurality of patterns may be used as a sensor performing a temperature measurement function of the heater 30. Accordingly, there is no need to mount a separate temperature sensor when manufacturing the aerosol-generating device, and thus the device manufacturing process may be simplified. In addition, the temperature of the heating surface of the heater 30 may be more accurately measured through the sensor pattern (e.g., 33), so that the control precision of the heater 30 may be improved.

Hereinafter, various types of aerosol-generating devices 100-1, 100-2, and 100-3 to which the heaters 10, 20, and 30 according to embodiments may be applied are described with reference to FIGS. 8 to 10.

FIGS. 8 to 10 illustrate the aerosol-generating devices 100-1, 100-2, and 100-3. In detail, FIG. 8 illustrates a cigarette-type aerosol-generating device 100-1, and FIGS. 9 and 10 illustrate hybrid-type aerosol-generating devices 100-2 and 100-3 using a liquid and a cigarette together. Hereinafter, each aerosol generating device 100-1 to 100-3 is described.

As shown in FIG. 8, the aerosol generating device 100-1 may include a heater 140, a battery 130, and a controller 120. However, embodiments are not limited thereto, and some components may be added or omitted. In addition, each component of the aerosol-generating device 100-1 shown in FIG. 8 represents functionally distinct functional elements, and a plurality of components may be implemented in a form that is integrated with each other in an actual physical environment, or a single component may be implemented in a form that is divided into a plurality of detailed functional elements. Hereinafter, each component of the aerosol generating device 100-1 is described.

The heater 140 may be arranged to heat a cigarette 150 inserted therein. The cigarette 150 includes a solid aerosol-generating substrate and is configured to generate an aerosol as it is heated. The generated aerosol may be inhaled through the mouth of the user. An operation of the heater 140, a heating temperature, etc. may be controlled by the controller 120.

The heater 140 may be implemented as the heaters 10, 20, 30 described above, and in this case, the preheating time of the aerosol-generating device 100-1 may be shortened and the taste of early smoking may be improved, through the high-speed heating.

The battery 130 may supply power used to operate the aerosol generating device 100-1. For example, the battery 130 may supply power so that the heater 140 may heat the aerosol-generating substrate included in the cigarette 150, and may supply power required for the controller 120 to operate.

In addition, the battery 130 may supply power required to operate electrical components such as a display, a sensor, and a motor installed in the aerosol generating device 100-1.

The controller 120 may control the operation of the aerosol generating device 100-1 as a whole. For example, the controller 120 may control the operation of the heater 140 and the battery 130, and may also control the operation of other components included in the aerosol generating device 100-1. The controller 120 may control the power supplied by the battery 130, the heating temperature of the heater 140, and the like. In addition, the controller 120 may determine whether the aerosol-generating device 100-1 is in an operable state by checking the state of each of the components of the aerosol-generating device 100-1.

In embodiments, the controller 120 may dynamically control the operation of a plurality of patterns constituting the heater 140 based on a preset condition, and this embodiment will be described in detail later with reference to FIG. 11.

The controller 120 may be implemented by at least one processor. The processor may be implemented as an array of a plurality of logic gates, or may be implemented as a combination of a general-purpose microprocessor and a memory in which a program executable in the microprocessor is stored. In addition, those of ordinary skill in the art to which the present disclosure pertains may understand that the controller 120 may be implemented with other types of hardware.

Hereinafter, the hybrid aerosol generating devices 100-2 and 100-3 are described with reference to FIGS. 9 and 10.

FIG. 9 illustrates an aerosol-generating device 100-2 in which a vaporizer 1 and a cigarette 150 are arranged in parallel, and FIG. 10 illustrates an aerosol-generating device 100-3 in which a vaporizer 1 and a cigarette 150 are arranged in series. However, the internal structure of the aerosol generating device is not limited to that illustrated in FIGS. 9 and 10, and the arrangement of components may be changed depending on a design method.

In FIGS. 9 and 10, the vaporizer 1 may include a liquid reservoir configured to store a liquid aerosol-generating substrate, a wick configured to absorb the aerosol-generating substrate, and a vaporizing element configured to vaporize the absorbed aerosol-generating substrate to generate an aerosol. The vaporizing element may be implemented in various forms, such as a heating element, a vibrating element, and the like. In embodiments, the vaporizer 1 may also be designed in a structure that does not include a wick. The aerosol generated by the vaporizer 1 may pass through the cigarette 150 and be inhaled through the user's mouth. The vaporizing element of the vaporizer 1 may also be controlled by the controller 120.

Example aerosol-generating devices 100-1 to 100-3 to which the heaters 10, 20, and 30 according to embodiments may be applied have been described with reference to FIGS. 8 to 10. Hereinafter, a method of controlling a film-type heater manufactured for an aerosol-generating device according to embodiments will be described with reference to FIG. 11.

Hereinafter, in describing the control method, it is assumed that the heater (e.g., 10, 20, 30) may include a plurality of patterns including the first pattern and the second pattern, and the function, operation, and/or heating temperature of each pattern may be independently controlled. In addition, the control method may be implemented with one or more instructions executed by the control unit 120 or a processor, and may be understood as being performed by the controller 120 when the subject of a specific operation is omitted.

FIG. 11 is an example flowchart illustrating a method of controlling a heater according to embodiments.

As shown in FIG. 11, the control method may start in step S10 of monitoring the smoking status. Here, the smoking status may include all types of status information measurable during smoking, such as a smoking progress stage, a puff status, and a temperature of a heater.

In steps S20 and S30, in response to determining that a first condition is satisfied, both the first pattern and the second pattern may be operated as heating patterns. For example, the controller 120 may control each pattern to perform a heating function by applying sufficient power to the first pattern and the second pattern.

The first condition may be defined and set in various ways. For example, the first condition may be a condition indicating a preheating time (e.g., initial 5 seconds, etc.). In this example, the temperature may be raised at a high speed by operating a plurality of patterns as a heating pattern during the preheating time. As another example, the first condition may be a condition defined based on the puff state (e.g. puff interval, puff strength), for example, a condition indicating that the puff interval is less than or equal to the reference value or the puff strength is greater than or equal to the reference value. In this example, as the puff interval is shortened or the puff strength is increased, a plurality of patterns may be operated as heating patterns to provide a stronger taste of smoking to the user. In addition, the first condition may be defined based on various factors such as smoking time, number of puffs, heating temperature of a heater, and the like.

In embodiments, control in which the number of heating patterns (i.e., the number of patterns operating as heating patterns) among the plurality of patterns is adjusted may be performed. For example, the controller 120 may increase or decrease the number of heating patterns depending on the puff state (e.g. puff interval, puff strength). For example, when the puff strength is equal to or greater than the reference value, the number of patterns increases, and when the puff strength is less than the reference value, the number of patterns decreases. As another example, the controller 120 may increase or decrease the number of heating patterns according to the smoking progress stage. For example, the controller 120 may increase the number of heating patterns at the beginning of smoking, decrease the number of heating patterns during the middle of smoking, and increase the number of heating patterns again at the end of smoking to compensate for the taste of smoking. As another example, the controller 120 may perform feedback control by increasing or decreasing the number of heating patterns depending on the heating temperature of the heater.

In steps S40 and S50, in response to determining that a second condition is satisfied, a specific pattern may be operated as a sensor pattern. For example, the controller 120 may prevent the first pattern from generating heat by reducing the power applied to the first pattern, and may measure the temperature of the heater based on the TCR of the first pattern and the change in the resistance value.

The second condition may be set in various ways. For example, the second condition may be a condition indicating that the preheating time has elapsed. In this case, after the preheating is completed, feedback control according to the temperature measurement result of the heater may be performed. As another example, the second condition may be a condition defined based on the puff state (e.g., puff interval, puff strength), and for example, may be a condition indicating that the puff interval is greater than or equal to the reference value or the puff strength is less than or equal to the reference value. In this case, as the puff interval becomes longer or the puff strength becomes weaker, feedback control depending on the temperature measurement result of the sensor pattern may be performed.

In embodiments, the heat distribution of the heater heating surface may be measured using a plurality of sensor patterns. For example, the controller 120 may determine the uniformity of heat distribution by comparing the temperature measurement results of the sensor pattern at the center and the sensor pattern at the outer side. When heat is concentrated in the central region, the controller 120 may also perform a control such as supplying more power to the outer heating pattern or supplying less power to the central heating pattern. Depending on this control, heat may be uniformly generated over the entire heating surface of the heater.

FIG. 11 shows that step S40 is performed when the first condition is not satisfied, but this is only an example, and steps S20 and S40 may be performed independently of each other.

The control method of the film-type heater manufactured for the aerosol-generating device according to embodiments has been described with reference to FIG. 11. According to the above-described method, by dynamically controlling functions and operations of a plurality of patterns depending on preset conditions, the heater may be more efficiently utilized during smoking.

The embodiment described with reference to FIG. 11 may be implemented as computer-readable codes on a computer-readable medium. The computer-readable recording medium may be, for example, a removable recording medium (CD, DVD, Blu-ray disk, USB storage device, removable hard disk) or a fixed recording medium (ROM, RAM, computer-equipped hard disk). The computer program recorded on the computer-readable recording medium may be transmitted to another computing device through a network such as the internet and installed in the other computing device, thereby being used in the other computing device.

Hereinafter, the configuration and effects of the heaters 10, 20, and 30 described above in examples and related examples will be described in more detail. However, because the following embodiments are only some examples of the heaters 10, 20, and 30 described above, the scope of the present disclosure is not limited to the following examples.

Example 1

A heater in which a pattern of a constantan material was arranged in parallel was manufactured. In detail, the patterns were arranged in a three-row parallel structure as illustrated in FIG. 1, and the spacing between the patterns was equally designed to be 0.5 mm, and the thickness of the pattern was equally designed to be 20 μm. In addition, a PI film was used as the base film of the heater.

Related Example 1

The same heater as in Example 1 was manufactured, except that the copper material pattern was arranged in series.

Experimental Example 1: Comparison of Temperature Increase Rate

An experiment was conducted to compare the temperature increase rate for the heaters according to Example 1 and Related Example 1. In detail, an experiment was conducted to measure the temperature change of the heater depending on time, and the experimental results are shown in FIG. 12.

FIG. 12 illustrates that the heating rate of the heater according to Example 1 is significantly faster than the heating rate of Related Example 1. For example, assuming that the target temperature is 300° C., it may be confirmed that the heater according to Example 1 reaches the target temperature in about 1.6 seconds, whereas the heater according to Related Example 1 reaches the target temperature after about 2.7 seconds. This is due to the resistance value hardly increasing when the temperature is raised due to the low TCR of the constantan material, and thus, the current flowing through the pattern is hardly reduced when the temperature is raised. According to these experimental results, it may be seen that the heater (e.g., 10) according to the above-described embodiments may shorten the preheating time of the aerosol-generating devices (e.g., 100-1 to 100-3) and improve the taste of early smoking.

Examples 2 and 3

As shown in FIG. 13, heaters according to Examples 2 and 3 were manufactured by arranging 5 rows of patterns of a constantan material in parallel. The heater according to Example 2 was arranged such that the spacing between the patterns became wider toward the outside, and the heater according to Example 3 was arranged to have substantially equal spacing. For detailed numerical values for the thickness, length, and spacing of the pattern, refer to Tables 2 and 3 below. Table 2 relates to Example 2, and table 3 relates to Example 3.

TABLE 2

| classification | row 1 (outer) | row 2 | row 3 | row 4 | row 5 (center) |
| --- | --- | --- | --- | --- | --- |
| thickness(μm) | 20 | 20 | 20 | 20 | 20 |
| length(mm) | 70.97 | 69.51 | 66.51 | 66.42 | 63.42 |
| spacing(mm) | 0.55 | 0.5 | 0.45 | 0.42 | 0.4 |

TABLE 3

| classification | row 1 (outer) | row 2 | row 3 | row 4 | row 5 (center) |
| --- | --- | --- | --- | --- | --- |
| thickness(μm) | 20 | 20 | 20 | 20 | 20 |
| length(mm) | 70.97 | 69.51 | 66.51 | 66.42 | 63.42 |
| spacing(mm) | 0.49 | 0.47 | 0.45 | 0.45 | 0.43 |

Experimental Example 2: Comparison of Heat Distribution

An experiment for measuring the heat distribution of the heating surface of the heater according to Examples 2 and 3 was conducted, and the experimental results thereof are shown in FIGS. 14 and 15. FIGS. 14 and 15 show the heating surface of the heater according to Examples 2 and 3, respectively, in the form of a heat map.

Comparing FIGS. 14 and 15, it may be seen that the concentrated heating region (refer to the central region) of FIG. 15 is more concentrated (e.g., the concentrated heating area is formed more narrowly) than that of FIG. 14, which indicates that the heat concentration phenomenon is stronger in the heater according to Example 3. This may also indicate that the resistance value of the outer pattern may be reduced by designing the gap on the pattern to become wider toward the outer side, and ultimately the heat concentration phenomenon may be alleviated.

The configurations and effects of the heaters 10, 20, and 30 described above have been described in more detail through Examples and Related examples.

Although the embodiments have been described above with reference to the accompanying drawings, those of ordinary skill in the art to which the present disclosure pertains may understand that the present disclosure may be implemented in other specific forms without changing the technical idea or essential features thereof. Therefore, it should be understood that the embodiments described above are illustrative in all respects and not restrictive. The protection scope of the present disclosure should be interpreted by the following claims, and all technical ideas within the equivalent range should be interpreted as being included in the scope of the technical ideas defined by the present disclosure.

The invention claimed is:

1. A heater comprising:
   a first electrically conductive pattern configured to perform heating; and
   a second electrically conductive pattern disposed in parallel with the first electrically conductive pattern,
   wherein the first electrically conductive pattern includes a material having a temperature coefficient of resistance that is less than or equal to 1,000 ppm/° C.
   wherein the second electrically conductive pattern is disposed outside of the first electrically conductive pattern, and
   wherein a resistance of the second electrically conductive pattern is less than or equal to a resistance of the first electrically conductive pattern.

2. The heater of claim 1, wherein the first electrically conductive pattern includes at least one of constantan, manganin, and nickel silver.

3. The heater of claim 1, wherein the first electrically conductive pattern includes a material having a resistivity that is greater than or equal to $3.0 \times 10^{-8}$ Ωm.

4. The heater of claim 1,
   wherein the heater further includes a third electrically conductive pattern disposed outside of the second electrically conductive pattern, and
   wherein a distance between the third electrically conductive pattern and the second electrically conductive pattern is wider than a distance between the second electrically conductive pattern and the first electrically conductive pattern.

5. The heater of claim 1,
   wherein the second electrically conductive pattern includes a material having a resistivity less than a resistivity of the first electrically conductive pattern.

6. The heater of claim 1,
   wherein a thickness of the second electrically conductive pattern is greater than a thickness of the first electrically conductive pattern.

7. The heater of claim 6, wherein the thickness of the second electrically conductive pattern is less than or equal to 30 μm.

8. The heater of claim 1, wherein the second electrically conductive pattern is configured to measure temperature of the heater, and includes a material having a temperature coefficient of resistance greater than a temperature coefficient of resistance of the first electrically conductive pattern.

9. The heater of claim 8, wherein the second electrically conductive pattern is disposed to measure the temperature of the central region of the heating surface of the heater, and
   wherein a distance from a center of the heating surface to a periphery of the central region is 0.15 to 0.5 times a distance from the center of the heating surface to a periphery of the heating surface.

10. An aerosol generating device comprising:
    a housing forming an accommodating space in which an aerosol-generating article is accommodated; and
    a heater configured to heat the aerosol-generating article accommodated in the accommodating space,
    wherein the heater comprises:
       a first electrically conductive pattern including a material having a temperature coefficient of resistance less than or equal to 1,000 ppm/° C.; and
       a second electrically conductive pattern disposed in parallel with the first electrically conductive pattern,
    wherein the second electrically conductive pattern is disposed outside of the first electrically conductive pattern, and
    wherein a resistance of the second electrically conductive pattern is less than or equal to a resistance of the first electrically conductive pattern.

11. The aerosol generating device of claim 10, further comprising:
    a controller configured to control the heater,
    wherein the controller is further configured to independently control the first electrically conductive pattern and the second electrically conductive pattern.

* * * * *